Sept. 24, 1963 G. I. WILLIAMS 3,105,224

SWITCHING CIRCUIT IN A MATRIX ARRANGEMENT UTILIZING TRANSISTORS FOR SWITCHING INFORMATION

Filed Aug. 6, 1957

INVENTOR
GERALD I. WILLIAMS
BY Cushman, Darby & Cushman
ATTORNEYS

United States Patent Office 3,105,224

Patented Sept. 24, 1963

3,105,224

SWITCHING CIRCUIT IN A MATRIX ARRANGEMENT UTILIZING TRANSISTORS FOR SWITCHING INFORMATION

Gerald I. Williams, Roseville, Minn., assignor to Sperry Rand Corporation, New York, N.Y., a corporation of Delaware Filed Aug. 6, 1957, Ser. No. 676,599
19 Claims. (Cl. 340—166)

Figure 1:
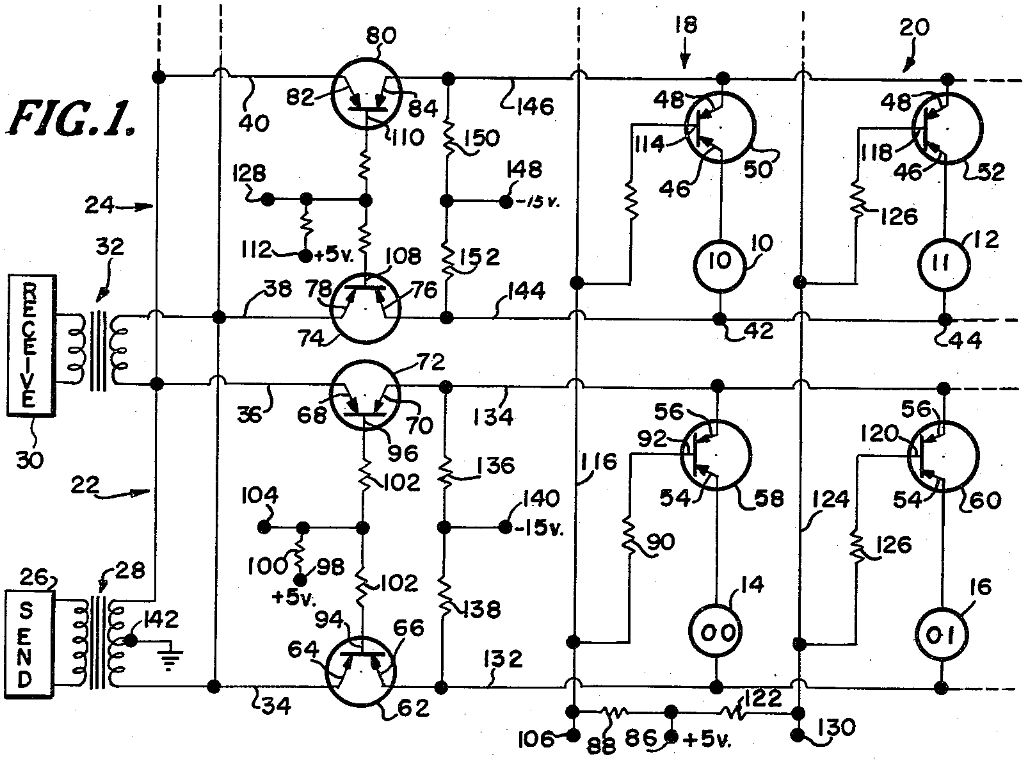

This invention relates generally to a switching circuit employing elements having three electrodes for transferring signals between devices at opposite ends of a circuit path, and more particularly, to such a switching circuit utilizing transistors as the three electrode elements. In addition, the invention relates to the employment of such switching circuits whereby signals may be transferred between a single device at one end of a circuit path or paths and a selected one of a plurality of other devices coupled across the circuit path or paths.

In many applications, such as in high speed data processing systems, it is often desirable to have a rapid means of selecting a load or energy source from a large array of loads or sources. To consider a specific example, electronic data handling systems require extensive data storage facilities such as offered by the magnetic drum. (See U.S. Patent No. 2,540,654, issued February 6, 1951, to A. A. Cohen et al.) Most magnetic drums are equipped with a plurality of read-record magnetic transducing heads. These heads serve the dual purpose of "writing" information on the revolving drum in which case it acts as a load and of "reading" or sensing information already contained on the magnetic coating of the drum in which case it acts as an energy source. Of this plurality of heads, only one may be in operation at a given time. It is obvious then, that by appropriate switching, a great reduction in reading and writing amplifiers and associated circuitry can be realized.

The invention is therefore particularly applicable to read-write systems. Another application of the invention is in memory matrix systems whereby the magnetic cores in the system may be selectively switched, inhibited or sensed. Many other applications of this invention are also possible, and limitation to the applications mentioned is not intended.

Basically, the invention comprises elements which have three electrodes and conductive and non-conductive states. The elements are serially connected in a circuit path between devices, one of which provides signals to be transferred and utilized by another device. Upon making each of the elements conductive, the signals may be transferred between the devices. Preferably, the elements are transistors serially connected in the circuit path by their emitter and collector electrodes. Each transistor is provided with biasing means which maintains the transistor in a non-conductive state in the absence of a control signal to the base electrode. Preferably, one transistor is located in each side of the circuit path, and a third is disposed in series with one of the devices. When the latter transistor receives a control signal at its base electrode, signals still cannot be transferred between the devices unless each of the other two transistors simultaneously receives a second control signal. In addition, each of the electrodes of the third transistor may be biased so as to prevent conduction between its emitter and collector electrodes even when its base electrodes receive a control signal, but no control signal is provided to the other two electrodes. Then, in the presence of both control signals the potential to the emitter and collector electrodes of the third transistor is effectively removed so that all three of the transistors are then in a conductive state to allow transfer of signals between the devices. In an extension of the basic switching system, signals may be transferred between one of a plurality of devices and the device located on the opposite end of the circuit paths.

The addition of the potential to each of the electrodes of the third transistor provides a means by which stray voltages induced in the circuit path are prevented from causing ambiguity in the devices connected to the switching system. In certain applications this becomes quite advantageous, while in others such a potential is not necessary because of the greater amount of current required in the circuit. When a plurality of devices is located at corresponding ends of a plurality of circuit paths and a certain one of these devices in each path is selected by the application of a control signal to the base electrode of the transistors associated with the so-selected devices, while the control transistors for only one circuit path receive a control signal at their base electrodes, the control signal applied to the base electrodes of the transistors associated with the devices which are not in the selected circuit path, do not drain any of the power of the control signal since the control transistors for these other paths are in a non-conductive state and preclude current from passing therethrough. This is one of the main advantages of the switching system of this invention since all of the power of the control signal is employed with a selected one of the devices and is not lost in the other circuits associated with the unselected devices.

It is accordingly the primary object of this invention to provide a new and improved switching system.

Another object of the present invention resides in the provision of a switching circuit using a plurality of elements each having three electrodes as the switching elements for transferring signals between given devices.

Another object of the present invention in conjunction with the preceding objects is the provision of means for preventing stray voltages induced in the circuit from providing ambiguous signals in the circuit.

Another object of this invention is the provision of a switching circuit employing elements having three electrodes for transferring signals between one of a plurality of devices and another device.

Another object of this invention in conjunction with the last preceding object is the provision of a switching circuit in which none of the power of a control signal, utilized to energize the element closest associated with the selected device, is dissipated in other parts of the system.

A further object of this invention is the provision of a switching circuit whereby a number of transducers may share a single energy source and a single receiver alternately upon the selection of a given one of the transducers by a control signal without loss of any of the power of the control signal through circuits associated with the unselected devices.

Yet another object of this invention is the provision of a switching circuit employing symmetrical transistors in such a manner that both positive and negative signals can be transferred over a circuit path having an energy source and load at opposite ends thereof.

Yet another object of this invention is the provision of a switching system by which reading and writing in a storage system may be accomplished by the same circuit.

Still another object of this invention is the provision of a switching circuit for a magnetic core memory system wherein a particular group of cores may be selected by control signals without loss of power of the control signals to circuitry associated with unselected cores.

Figure 2:
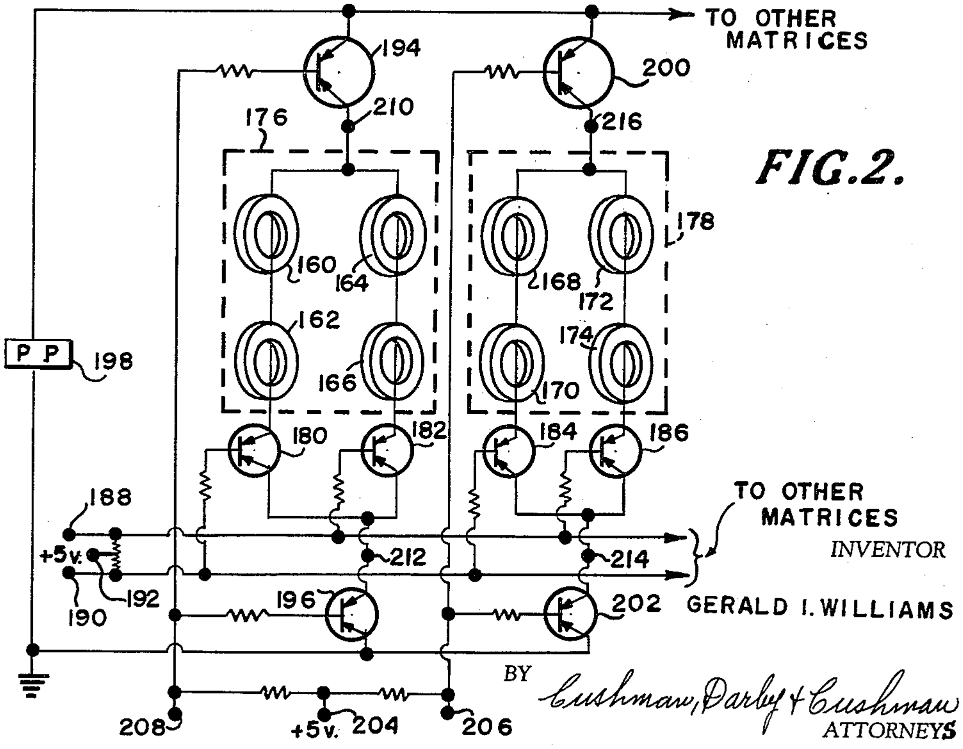

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

FIGURE 1 illustrates the invention as applied to the selective switching of signals betwen a device and one of a plurality of devices, and FIGURE 2 illustrates the invention as applied to a magnetic core memory matrix system.

The switching system of this invention is well adapted to transfer of bi-polar signals, and the description will proceed in reference thereto although it is to be understood that uni-polar signals may be transferred as well. In FIGURE 1 the devices 10, 12, 14 and 16 to which signals are to be transferred to or from, are conveniently arranged in a 2 x 2 array, i.e., in two columns 18 and 20 and two rows 22 and 24. This is an illustrative embodiment for convenience in explaining the operation of the invention, but it will be understood that any other desired arrangement of such devices may be employed along with this invention. Additionally, a different number of devices may obviously be employed as long as each is coupled into the circuitry in the manner herein described for allowing switching of signals to or from the devices. As an aid in helping to understand the invention, it may be considered that the devices are each transducing devices including the coils of reading and/or writing heads such as normally employed with magnetic recordings on a drum or the like. However, limitation thereto is not intended since it is obvious that the devices may be any other type of devices which either act as a load or source of energy. For purposes of sending a signal to one of the devices 10, 12, 14 or 16 in a manner to be presently explained the sending circuit 26 along with a device such as transformer 28 are employed, while receiving circuit 30 along with another transformer device 32 are used to receive signals from any selected one of the devices.

The devices 10, 12, 14 and 16 are conveniently designated also by numbers corresponding to their locations in the array. For example, devices 10 and 14 have a "0" units designation for the first column 18 of such devices, while the devices 12 and 16 in the second column 20 have a "1" units designation. Other columns (not shown) would have increasingly higher order designations. In succeeding rows 22, 24, the devices are similarly designated by their tens digit. For example, devices 14 and 16 in the first row 22 have a "0" tens designation, while devices 10 and 12 in the second row 24 have a "1" tens designation. Further rows (not shown) would have in succession higher order tens designations.

For each row of devices there is a circuit path including lines 34 and 36 for row 22 and lines 38 and 40 for row 24, each line being a different side of a circuit path. The circuit paths are connected in parallel with each other and to one winding of the transformers 28 and 32. The different devices associated with the different rows thereof are coupled across the circuit path for a given row by a transistor serially connected with the device. For example, devices 10 and 12 for row 24 are coupled at junctions 42 and 44, respectively, to one side of the circuit path including line 38. The other side of devices 10 and 12 are coupled to line 40 of the circuit path via electrodes 46 and 48 of transistors 50 and 52 respectively. Devices 14 and 16 are similarly coupled across lines 34 and 36 via electrodes 54 and 56 of transistors 58 and 60, respectively. Between the transformers 28, 32 and each of the device-transistor serial combinations, which are the closest ones in their respective circuit paths to the ends thereof whereat transformers are coupled, is a pair of circuit path control transistors. For example, in the circuit path for row 22, transistor 62 is connected in line 34 serially by its electrodes 64 and 66, while electrodes 68 and 70 serially connect transistor 72 in line 36. Similarly, the circuit path for row 24 includes transistor 74 serially connected in one side of the path by connection of electrodes 76 and 78 in line 38, and transistor 80 is serially connected in the other side of the circuit path by serial connection of electrodes 82 and 84 to line 40.

Considering any one of the devices 10, 12, 14 or 16, it will be readily apparent that the transistors between the device and either one of the transformers 29, 32, are in a series circuit with the device being at one end of the circuit path and the transformer being at the other end thereof. More explicitly, with reference to device 14, transistor 58 is serially connected with device 14 both of which are serially connected via the electrodes 64 and 66 of transistor 62 and electrodes 68 and 70 of transistor 72 to opposite sides of the circuit path which is connected to either of the transformers 28, 32. Therefore, it becomes apparent that upon desiring to transfer signals between device 14 and one of transformers 28, 32, that each of the transistors 58, 62, and 72 must be in a conductive state so as to pass signals between the two electrodes serially in the circuit path.

Normally, each of the transistors is biased to a non-conductive state. For transistor 58, this is accomplished by applying a potential to terminal 86 through coupling resistor 88 and current limiting resistor 90 to the base electrode 92 of transistor 58. The potential at terminal 86 when applied to base electrode 92 alone is sufficient to prevent conduction of a signal between electrodes 54, 56 of the transistor since the impedance of the transistor is then comparatively high. Each of transistors 62, 72 are similarly biased to a non-conductive or high impedance state by application of a steady potential to base electrodes 94 and 96 from terminal 98 via resistors 100 and 102. Transistors 62 and 72 may be caused to be in a conductive or relatively low impedance state so that they will pass signals between their electrodes 64, 66, 68 an 70 by the application of a selecting or control signal to terminal 104 as long as this signal is sufficient to overcome the effect of the biasing potential at terminal 98.

With only the circuitry thus far described, transistor 58 may be caused to be in a low impedance state and thereby be made conductive so that it will pass signals between its electrodes 54, 56, by applying a selecting or control signal to terminal 106. This latter signal must, of course, be sufficient to overcome the biasing potential at terminal 86. When control signals are applied simultaneously to terminals 104 and 106, each of the transistors 58, 62 and 72 are made conductive so that signals may either be sent to the device 14 from the sending circuitry 26, or may be received by the receiver 30 from device 14.

As may be noted in FIGURE 1, all the other transistors also have base electrodes similarly coupled to biasing potentials which maintain the respective transistors in a non-conductive state in the absence of any other input signal to the base electrode. That is, control transistors 74 and 80 receive at their base electrodes 108 and 110 respectively a steady potential applied to terminal 112, while the base electrode 114 of transistor 50 is connected by line 116 to the steady biasing potential present at terminal 86. The base electrodes 118 and 120 of transistors 52 and 60, respectively, are also coupled to the biasing potential at terminal 86 via resistor 122, line 124 and the current limiting resistors 126.

In order to make transistors 74 and 80 conductive, a signal is applied to terminal 128, thereby permitting a signal to pass over both sides of the circuit path for row 24 on lines 38 and 40. Since line 116 not only couples the steady bias from terminal 86 to the base electrode 114 of transistor 50, but also couples the control signal at terminal 106 thereto, signals may be transferred between device 10 and one of transformers 28, 32 by simultaneous application of control signals at terminals 106 and 128. To make either one of transistors 52 or 60 conductive, considering only the circuitry thus far described, a control signal is applied to terminal 130 so as to overcome the effect of the bias from terminal 86 on the base electrodes 118 and 120. Signals may then be transferred between one of devices 12, 16 and one of the transformers 28, 32 by simultaneous application of a control signal at the appropriate one of terminals 104, 128. Therefore, it becomes apparent that any one of the devices 10, 12, 14, 16 may be selected for sending or receiving signals, as the case may be, to or from transformers 28, 32 by the application of two control signals to the appropriate ones of terminals 106 or 130 and 104 or 128.

As before indicated, devices 10, 12, 14 and 16 may be either a load or an energy source, or the combination of the two. If the devices act only as a load, the receiving circuit 30 and transformer 32 need not be utilized, and conversely, if the devices act only as energy sources the circuitry 26 along with its transformer 28 need not be employed. However, if the devices are to act alternately as load and energy sources, such as read-write heads, both the sending and receiving circuits and transformers are desirable. In such a case, the signal sending circuit 26 and the receiving circuit 30 are each equipped with means for effecting an open circuit or at least a very substantial impedance through their respective transformers when the other of such circuits is operative while the desired transistors are in a conductive state to transfer signals to or from a selected one of the devices 10–16. Receiving and sending circuits of any type may be employed and the means to disable them may merely be a switch so as to disconnect same from their transformer 28 or 32. The type of sending and receiving circuits will generally depend upon the type of device that devices 10–16 are. If these devices are combination reading and writing transducers, for example of the type illustrated in FIGURE 5 of Cohen et al., Patent No. 2,540,654, the sending circuit 26 may be similar to the writing circuit shown in FIGURE 9 of Cohen et al., Patent No. 2,614,-169, while the receiving circuit may be similar to the reading amplifier illustrated in FIGURE 11 thereof. Other suitable reading and writing circuitry is disclosed in the United States application of John L. Hill, Serial No. 431,108, filed May 20, 1954, now U.S. patent No. 2,969,108, issued Jan. 24, 1961.

In FIGURE 1 each of the transistors is illustrated as a PNP symmetrical type transistor. That is, each of the two electrodes normally considered as emitter and collector, respectively, are illustrated with arrows pointing toward the base. Therefore, either of the electrodes may be considered an emitter or collector, and the term "symmetrical" is meant to indicate that the electrodes can be interchanged in their connection in the series circuit without any substantial change in the operation of the transistor, the forward current gain in either case being substantially unchanged. By utilizing symmetrical transistors, signals or pulses or both positive and negative polarity can be passed through any of the transistors and over the same circuit path lines. Therefore, if the devices 10–16 are magnetic reading-writing transducers, binary "1" and "0" signals may be read onto or from a magnetic surface.

It is to be understood that NPN transistors can also be employed with this invention. Additionally, the transistors may be non-symmetrical, if only unidirectional signals are to be transferred such as may be the case with given type loads or energy sources or when all signals of one polarity mean binary "1's," for example, and the absence thereof mean "0's." For PNP type transistors, a suitable steady biasing potential for the base electrodes thereof as applied to terminals 86, 98 and 112 is +5 volts. Suitable control signals for terminals 104, 106, 128 and 130 may be in the order of −10 volts. Limitation to these potentials is not intended, however.

The circuitry above described is suitable for use with many different types of devices 10–16, particularly those which require more current when acting as loads than do reading or writing transducers. When devices 10–16 comprise writing transducers, such may erroneously write a "1" when neither of the control transistors is in a conductive state since the circuit so far described is subject to the effective induction therein of stray voltages. For example, if a stray voltage is induced in one way or another across lines 132 and 134 in the circuit path for row 22 while a control signal is present at terminal 106, but none is present at terminal 104, the stray voltage may be sufficient to pass a signal between electrodes 54 and 56 of transistor 58, which is then in a conductive state, so as to provide an effective signal to device 14. To prevent device 14 from receiving stray signals, lines 132 and 134 are each coupled by resistors 136 and 138 respectively to a source of potential at terminal 140. For PNP type transistors this potential may be −15 volts, for example, with respect to ground potential. This potential is effectively provided to each of the electrodes 54, 56 of transistor 58.

Therefore, even when a control signal is present at terminal 106, transistor 58 is non-conductive as to any stray signals on line 132, 134 as long as transistors 62 and 72 are non-conductive. In other words, a control signal at terminal 106, in the absence of a control signal at terminal 104, overcomes the effect of the biasing potential at terminal 86, but does not overcome the effect of the potential at terminal 140. Therefore, the control signal at terminal 106, at such times, has the effect of changing the state of transistor 58 from a fully non-conductive state toward a conductive state. The transistor is thereby primed or conditioned so that upon the effective removal of the potential at terminal 140, signals may be passed between the electrodes 54, 56.

When no control signal is present at terminal 104, transistors 62 and 72 present a high impedance to passage of current from the potential at terminal 140 between either electrodes 64, 66 or 68, 70 to ground potential at the center tap 142 of the secondary winding of transformer 28. Electrodes 66 and 70 as well as lines 132 and 134 are therefore referenced to ground potential and consequently cannot "float" in potential. Substantially all of the potential at terminal 140 is applied to electrodes 54 and 56 of transistors 58 and 60 when no control pulse is present at terminal 104. However, when a control signal is applied to terminal 104, the impedance between electrodes 64 and 66, as well as between electrodes 68 and 70, becomes quite low, thereby providing a low impedance path to ground for the current from the potential applied at terminal 140. This in effect removes the potential from electrodes 54 and 56 of transistors 58 and 60 so as to make these transistors fully conductive when a control signal is applied to either terminals 106 or 130.

The circuit path for row 24 is also provided with a means for impressing a potential to each side thereof so as to prevent stray signals from effecting devices 10 and 12. Lines 144 and 146 in the circuit path for row 24 each have applied thereto a potential at terminal 148 via resistors 150 and 152. Consequently, when either of terminals 106 or 130 receives a control signal, the associated transistor 50 or 52 is changed toward its conductive state, but does not become conductive because of the relative potentials between the base electrode and the two other electrodes 46, 48 as caused by the potential applied to terminal 148. However, upon the existence of a control signal to terminal 128, the potential at terminal 148 is effectively removed from electrodes 46 and 48. Either of transistors 50 and 52 may then be caused to be in a conductive state by the simultaneous existence of control signals at terminal 128 and the associated one of terminals 106, 130.

One of the advantages of this invention, whether employing the biasing potential to terminals 140 and 148 or not, is that none of the power of the control signals applied to terminals 106, 130, is lost or dissipated through transistors associated with unselected devices. That is, all the power input of a control signal is employed to energize the base of a transistor which is serially connected with a selected device without any of the control signal power being used by any of the other transistors. For example, when device 10 is selected for receiving or sending a signal by an application of control signals to terminals 106 and 128, the power of the control signals at terminal 106 is fully employed to energize the base electrode 114 so that the transferred signal may flow between electrodes 46 and 48 of transistor 50. This is true even though the control signal at terminal 106 also energizes base electrode 92 of transistor 58, since no signal can be transferred to or from device 14 because conduction of such a signal over lines 34 and 36 in the circuit path for row 22 is impossible unless a control signal is present at terminal 104 also. Therefore, even without the potential at terminal 140 whereby electrodes 54 and 56 are biased to prevent transistor 58 from being in a conductive state even in the presence of a control signal at terminal 106, signals cannot be transferred between device 14 and either one of transformers 28, 32. However, if the device 14 is sensitive enough to be energized by stray voltages induced across lines 132, 134, the addition of the potential at terminal 140 is desirable so as to hold the electrodes 54, 56 nonconductive in the absence of a control signal at terminal 104. Regardless of the presence or absence of a potential to terminals 140 or 148, the power of the control signals applied to terminals 106 and 130 is fully conserved for use with the transistor which is associated with the device that is selected for receiving or sending signals over a circuit path.

When transistor 50 and its homologues are symmetrical both of the control transistors pairs 62, 72 and 74, 80 are necessary since otherwise power would be lost in the flow thereof from the base electrode to one of the other electrodes in a transistor associated with an unselected device and thence to ground at center tap 142 over the circuit path line not having a control transistor. However, when unidirectional signals are to be transferred and nonsymmetrical transistors are employed, very little current from a control signal will pass from the base to the emitter electrode so that the control transistor in the emitter electrode side of the circuit path may be omitted, if desired, at the sacrifice of the loss of some control signal power.

As previously mentioned, the devices 10–16 may take any form desired, and if considerable current is required to operate any one of the devices, the potential supply at terminals 140 and 148 is not necessary. A good example of devices which may be used in the circuit without the potential at terminals 140 and 148 are magnetic cores. To cause switching of a magnetic core, more current is required than that generally produced by stray voltages which might somehow or other be induced in any one of the circuit paths. Therefore, it becomes apparent that the circuitry of FIGURE 1 may be employed with a magnetic core memory selection system. For example, each of the devices 10 through 16 may comprise a given number of magnetic cores with the line running to the devices being coupled to the cores. In this manner, the sending circuit 26 may be employed as a writing circuit whereby a selected column (or row as the case may be) of cores may have a half current provided thereto in a coincident current type system. It is to be understood that a different switching system would be employed to provide the other half current for changing a selected core to its "1" or "0" magnetic state. In like manner, the sending circuit 26 may comprise an inhibit circuit and the receiving circuit 30 may be utilized as a sensing circuit to read the state of any given group of cores.

By assigning the cores which comprise devices 10 and 12 to one plane of a memory system, and the cores comprising devices 14 and 16 to another plane of the memory system, it becomes apparent that selection of a given core in the system is readily possible. To illustrate such a situation more clearly, reference is now made to FIGURE 2. In this illustration, it may be considered that the magnetic cores 160 and 162 correspond to device 10 of FIGURE 1, while cores 164 and 166 correspond to device 12, cores 168 and 170 to device 14, and cores 172 and 174 to device 16. The cores 160–166 are grouped together so as to form two 2 x 2 matrices or planes shown enclosed by chain line 176. Cores 168–174 are similarly arranged on a second plane indicated by chain line 178. Transistor 180 corresponds to transistor 50 of FIGURE 1 in position and function, transistor 182 similarly corresponds to transistor 52 of FIGURE 1, while transistors 184 and 186 correspond respectively to transistors 58 and 60 of FIGURE 1. A steady potential which biases these transistors to a non-conductive state in absence of a control signal at the corresponding terminals 188 and 190 is applied to terminal 192. Control transistors 194 and 196 are in each side of a circuit path extending from device 198 in a manner similar to transistors 74 and 80 of FIGURE 1. In each side of another circuit path extending from device 198 are transistors 200 and 202 which may be likened to transistors 52 and 72 of FIGURE 1. Each of transistors 194, 196, 200 and 202 are maintained in a non-conductive state by application at terminal 204 of a steady biasing potential until such time as a control signal is applied to one of terminals 206 and 208. These latter two terminals correspond to terminals 104 and 128 of FIGURE 1.

Upon the application of a control signal at terminal 208, both of transistors 194 and 196 are placed in a conductive state, while a control signal at terminal 206 makes transistors 200 and 202 conductive. If the device 198 is a power pulse source, it becomes apparent that any one of the columns of cores may be selected for receiving half current fields by appropriately applying control signals to one of terminals 188, 190 and to one of terminals 206, 208. For example, if the column line coupling cores 160 and 162 is to receive a half current, control signals would be applied to terminals 190 and 208 simultaneously. It is, of course, understood that a similar transistor switching system may be employed to select a given row of cores and provide half currents thereto so that a single one of the cores may be switched.

Device 198 may be a sensing device rather than a power pulse supplying device so that with appropriate arrangement of the lines threading the cores, they may be sensed as to their magnetic state. The switching system is also applicable to cause inhibiting of cores which are not to be switched, and may also be adapted in a non-destructive sensing system for a magnetic memory. If in any one of the foregoing applications, the memory system is subject to having induced therein exceedingly strong stray voltages which might erroneously cause a change in the state of a core, a biasing system such as shown in FIGURE 1 for applying potentials at terminals 140 and 148 may be employed for applying a similar potential to each of junctions 210, 212, 214 and 216 in FIGURE 2. However, as previously indicated such biasing potentials are not generally required when magnetic cores are in the system since there is less chance of ambiguity by the switching of a core erroneously with stray voltages induced in the circuit.

Thus it is apparent that there is provided by this invention systems in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. A switching circuit for transferring predetermined information signals between at least two devices comprising a circuit having at least one of said devices at opposite ends thereof, said circuit being thereby divided into two sides, one of said devices providing said predetermined information signals at predetermined times for utilization thereof by another of said devices at the opposite end of the circuit, three elements each having a first electrode and two other electrodes, said other electrodes being coupled in series in said circuit, one of the elements being in one side of said circuit and the other two being directly coupled in the other side thereof, each of said elements having conductive and non-conductive states as to the passage of said information signals between its two other electrodes, means for biasing each of the elements to a non-conductive state, means coupled to the first electrode of one of the elements in the circuit side having two elements for supplying a control signal thereto to change the element at least toward its conductive state, and means coupled to the first electrode of each of the remaining elements for supplying thereto a second control signal to place same in a conductive state simultaneously, the arrangement being such that at least one of said predetermined information signals when provided by one of the devices at the opposite ends of said circuit may pass to the other only when all of said elements are in a conductive state.

2. A switching circuit as in claim 1 wherein said elements are transistors.

3. A switching circuit as in claim 1 wherein said elements are symmetrical transistors.

4. A switching circuit for transferring predetermined information signals between at least two devices comprising a circuit having at least one of said devices at opposite ends thereof, the circuit being thereby divided into two sides, one of said devices providing said predetermined information signals for utilization thereof by another of said devices at the opposite end of the circuit, three elements each having a first electrode and two other electrodes, said other electrodes being coupled in series in said circuit with two elements being directly coupled in one side of the circuit and the other element in the other side, each of said elements having conductive and non-conductive states as to the passage of said information signals beween its two other electrodes, means coupled to the first electrode of one of said elements for supplying thereto a first control signal to change the element toward a conductive state, means coupled to the first electrode of the other two elements for supplying thereto a second control signal to place same simultaneously in a conductive state, and means for biasing the two other electrodes of said one element so that it remains non-conductive upon the receipt thereby of said first control signal in the absence of said second control signal to said other two elements, the arrangement being such that no conduction takes place between any of the three electrodes of said one element unless said second control signal is present simultaneously with said first control signal at which time at least one of said predetermined information signals when provided by one of the devices at the opposing ends of said circuit can pass to the other through the said two electrodes of each of said three elements.

5. A switching circuit as in claim 4 wherein said elements are transistors.

6. A switching circuit as in claim 4 wherein said elements are symmetrical transistors.

7. A switching circuit as in claim 4 wherein the device at one of said opposing ends includes means for coupling the device at a predetermined point to a reference potential, and wherein the means for biasing the two other electrodes of said one element in the absence of said second signal includes a source of potential one side of which is at said reference potential and the other of which is coupled to each of the sides of said circuit between said one element and the other two elements.

8. A switching circuit for transferring information signals comprising a circuit having two sides, a first device coupled to said circuit path at one end thereof, a plurality of second devices coupled in parallel to said circuit path, one of said first and second devices being capable of generating said information signals at predetermined times, a plurality of elements each having a first electrode and two other electrodes, two of said elements being control elements connected in opposite sides of said circuit by their respective two other electrodes, means serially coupling the remaining elements by their two other electrodes between one side of said circuit and one of said second devices respectively, each of said elements having conductive and non-conductive states as to the passage of said predetermined information signals between its two other electrodes, means for biasing the elements to non-conductive states, means coupled to the first electrodes of the control elements for simultaneously placing same in conductive states and means respectively coupled to the first electrodes of said remaining elements for selectively changing same at least toward a conductive state, the arrangement being such that at least one of said information signals when generated may be transferred between said first device and a selected one of said second devices only when the element serially connected to the selected second device and said control elements are in their conductive states.

9. A switching circuit as in claim 8 and further including means for supplying a potential to each side of said circuit to hold said remaining elements in a non-conductive state even when selectively changed toward their conductive state unless said control elements are also in their conductive state.

10. A switching circuit as in claim 8 wherein each of said elements is a transistor.

11. A switching circuit as in claim 8 wherein each of said elements is a symmetrical transistor.

12. A switching circuit for transferring information signals generated by one device in a group thereof between a first of those devices and one of a plurality of second devices of said group, comprising a plurality of circuits each having two sides, said first device being connected at one end of each of said circuits, a plurality of said second devices for each of said circuits coupled across said circuits respectively, one second device across each circuit forming a set thereof, a plurality of transistors coupled respectively in series with said second devices, transistor means for each side of each of said circuits directly connected serially between said first device and the second device closest in the circuit to the first device, each of said transistors and transistor means having a first electrode and two other electrodes and being capable of being placed in conductive and non-conductive states as to passage of said signals through their two other electrodes, means for said transistors and transistor means for biasing same to a non-conductive state, means for each circuit for placing the transistor means therein simultaneously in a conductive state, and means for each set of second devices coupled to the first electrodes of each of the transistors serially coupled to the second devices in the set for changing the transistors in the set at least toward a conductive state, the arrangement being such that at least one of said information signals when generated may be transferred between said first device and a given one of said second devices only when the transistor serially coupled to the given second device is in a conductive state at the same time as is the transistor means in the circuit across which said given second device is coupled.

13. A switching circuit as in claim 12 and further including means for impressing a potential on each side of each of said circuits for keeping the transistor therein non-conductive until the transistor means therein each become conductive.

14. A switching circuit for transferring information signals generated by one device in a group thereof between a first of those devices and one of a plurality of second devices of said group comprising said second devices arranged into a plurality of first sets thereof and a plurality of second sets thereof, any set of each of said first and second sets having in common one of said second devices, a plurality of circuits each having two sides, said first device being coupled to each of the circuits at one end thereof, a plurality of first transistors each having a first electrode and two other electrodes, means including said two other electrodes serially and respectively coupling said transistors with said second devices and each so coupled transistor and second device across a circuit, each circuit having so coupled thereto a number of second devices equal to the number of said second sets, a plurality of second transistors each having a first electrode and two other electrodes, one of said second transistors being connected by said two other electrodes in each side of each of said circuits, each of said transistors having conductive and non-conductive states as to the passage of said information signals between its two other electrodes, means for biasing said transistors to a non-conductive state, means for each circuit coupled to the first electrodes of the second transistors therein for selectively placing the second transistors for any given circuit simultaneously in their conductive state, and means for each set of said plurality of second sets coupled to the first electrode of each of the first transistors serially coupled with the second devices in the set for changing the first transistors in the set at least toward a conductive state, the arrangement being such that at least one of said information signals when generated may be transferred between said first device and a given one of said second devices via the said two other electrodes of the first transistor serially coupled to the given device and the said two other electrodes of each of the second transistors in the circuit to which the given device is coupled only when the last three mentioned transistors are all in a conductive state.

15. A switching circuit as in claim 14 and further including means for impressing a potential on each side of each circuit for keeping the first transistors therein non-conductive until each of the second transistors therein become conductive.

16. A switching circuit for transferring predetermined information signals generated by one of a group of devices between a first of those devices and a selected one of a plurality of second devices of said group comprising a plurality of circuits each having two sides, said first device being coupled to each of said circuits at one end thereof, a first plurality of transistors for each of said circuits, each transistor having a first electrode and two other electrodes, one of said other electrodes being coupled to one side of the associated circuit, a plurality of second devices for each of said circuits coupled respectively between the other side of the circuit and the other of said two electrodes of the associated transistor thereby forming a plurality of transistor-second device serial combinations across each of said circuits, a second plurality of transistors each having a first electrode and two other electrodes, one of said second plurality of transistors being connected in each side of each circuit by its two other electrodes between said first device and the closest said serial combination for each circuit thereby making a set of two control transistors for each circuit, each of said transistors having conductive and non-conductive states as to the passage of any of said information signals through its said two other electrodes, means for biasing said transistors to a non-conductive state, means for each set of control transistors coupled to the first electrodes thereof for supplying thereto a first signal to place the set of control transistors simultaneously in a conductive state, a serial combination across each different circuit path forming different sets thereof, and means for each of said last mentioned sets coupled to the first electrodes of the transistors therein for supplying thereto a second signal to change each of the transistors in the set at least toward a conductive state, the arrangement being such that said predetermined information signals when generated may be transferred between said first device and a selected one of said second devices via the said two other electrodes of the transistor in the serial combination with the selected second device and via the said two other electrodes of the control transistors in the circuit to which said selected second device is coupled only when all three of the last mentioned transistors are in a conductive state.

17. A switching circuit as in claim 16 and further including means for each of said circuits for impressing a potential on each side of the circuit whereby each of the serial combination transistors is held in a non-conductive state even upon receipt of a second signal if the control transistors in the circuit to which a serial combination transistor is coupled is not in receipt of a first signal at the same time.

18. A switching circuit for transferring information signals of either polarity comprising a plurality of circuits each having two sides, signal sending means for generating said information signals at predetermined times and signal receiving means coupled in parallel with each of the circuits at one end thereof, a plurality of second devices for generating said information signals at other times and arranged in rows and columns, any one of said second devices being common only to a given row and a given column, a plurality of first transistors arranged in rows and columns and respectively coupled serially with said second devices thereby forming a plurality of serial combinations thereof, each of said circuits being coupled to the serial combinations in a different row, two control transistors for each circuit coupled in opposite sides thereof, each of said transistors having conductive and non-conductive states, means for each circuit path for making the control transistors therein simultaneously conductive, means for each column for priming the transistors therein, and means for supplying a potential to each side of each circuit for preventing conduction of any column transistor unless the control transistors of the associated circuit are conductive, the arrangement being such that signals of either polarity may be received by said receiving means from a selected second device when generated by that device, or sent to said selected second device by said sending means when generated by the latter, only if the control transistors for the circuit to which the selected second device is coupled are conductive while the transistor in the serial combination with said selected second device is conductive at the same time.

19. A switching circuit for allowing transfer of an information signal of either polarity between a first device and one of a plurality of second devices comprising said first and second devices one of which itself generates said information signal at predetermined times, a plurality of circuits coupled in parallel to said first device, each such circuit having two sides, a plurality of first transistors each of which is of the symmetrical type having a base electrode and two other electrodes, means coupling each of said transistors via its said two electrodes across a different one of said circuits in series with a respective second device, a plurality of pairs of second and third transistors each of which is of the symmetrical type having a base electrode and two other electrodes, each of said second transistors being serially connected by its said two electrodes in one side of a different one of said circuits between said first device and the respective said first transistor, each of said third transistors being serially connected by its said two electrodes in the other side of a different one of said circuits between said first device and the respective second device, means coupled to the base electrode of each of said transistors for biasing all said transistors to a non-conductive state to prevent passage of an information signal generated by any of said devices from passing between the said two electrodes of any of said transistors, a plurality of means respectively coupled to said pairs of second and third transistors at their base electrodes for selectively making the second and third transistors of any one pair simultaneously conductive as to the passage between their respective said two electrodes of an information signal when generated by one of said first and respective second devices if the respective first transistor is simultaneously conductive as to such information signal, means for applying a control signal to the base electrode of each of said first transistors concurrently to make them conditionally conductive, said first device being connected to a reference potential, and means for each of said circuits connected to one side thereof between the respective first and second transistors and to the other side thereof between the respective second device and third transistor for biasing both of the two electrodes of the respective first transistor non-conductive with respect to its base electrode even when said control signal is applied thereto unless the respective second and third transistors are simultaneously conductive so as to effectively place the two electrodes of the respective first transistor at said reference potential, the arrangement being such that none of the power of said control signal is lost in any first transistor whose respective second and third transistors are then non-conductive, but that all the power of the control signal is effective at the base of the first transistor in the one of said circuits whose respective second and third transistors are also conductive whereby an information signal of either polarity if then generated by one of the first and respective second devices can pass to the other through the said two electrodes of each of the first, second, and third transistors in that circuit.

References Cited in the file of this patent

UNITED STATES PATENTS

| | | |
|---|---|---|
| 2,627,039 | MacWilliams | Jan. 27, 1953 |
| 2,816,238 | Elliott | Dec. 10, 1957 |
| 2,825,889 | Henle | Mar. 4, 1958 |
| 2,829,281 | Van Overbeek | Apr. 1, 1958 |
| 2,840,801 | Beter et al. | June 24, 1958 |
| 2,867,695 | Buie | Jan. 6, 1959 |
| 2,885,572 | Falker | May 5, 1959 |
| 2,889,537 | Elliott | June 2, 1959 |

OTHER REFERENCES

"Directly Coupled Circuits," by R. H. Beter et al., published June 1955, "Electronics," pp. 132–136.